US011511711B2

(12) United States Patent
Van Thiel

(10) Patent No.: US 11,511,711 B2
(45) Date of Patent: Nov. 29, 2022

(54) ELECTRONICALLY CONTROLLABLE BRAKE SYSTEM AND METHOD OF ELECTRONICALLY CONTROLLING THE BRAKE SYSTEM

(71) Applicant: WABCO GmbH, Hannover (DE)

(72) Inventor: Julian Van Thiel, Hannover (DE)

(73) Assignee: WABCO GmbH, Hannover (DE)

( * ) Notice: Subject to any disclaimer, the term of this patent is extended or adjusted under 35 U.S.C. 154(b) by 599 days.

(21) Appl. No.: 16/495,205

(22) PCT Filed: Mar. 20, 2018

(86) PCT No.: PCT/EP2018/056950
§ 371 (c)(1),
(2) Date: Sep. 18, 2019

(87) PCT Pub. No.: WO2018/172319
PCT Pub. Date: Sep. 27, 2018

(65) Prior Publication Data
US 2020/0148180 A1    May 14, 2020

(30) Foreign Application Priority Data
Mar. 21, 2017 (DE) ..................... 10 2017 002 721.8

(51) Int. Cl.
*B60T 8/17* (2006.01)
*B60T 7/04* (2006.01)
(Continued)

(52) U.S. Cl.
CPC ............ *B60T 8/1701* (2013.01); *B60T 7/042* (2013.01); *B60T 7/12* (2013.01); *B60T 13/263* (2013.01);
(Continued)

(58) Field of Classification Search
CPC .......... B60T 8/1701; B60T 13/38; B60T 7/12; B60T 17/22; B60T 7/042; B60T 13/62;
(Continued)

(56) References Cited

U.S. PATENT DOCUMENTS 9,022,488 B2 *    5/2015  Beier ..................... B60T 13/683
                                                        303/20
11,203,332 B2 *  12/2021  Van Thiel ............... B60T 17/22
(Continued)

FOREIGN PATENT DOCUMENTS

DE    102005062907 B3    5/2007
DE    102008009043 B3    5/2009
(Continued)

OTHER PUBLICATIONS

Translation of German Patent No. DE 102008009043 obtained from website: https://worldwide.espacenet.com on Aug. 3, 2022.*
(Continued)

*Primary Examiner* — Pamela Rodriguez
(74) *Attorney, Agent, or Firm* — Dickinson Wright PLLC

(57) ABSTRACT

An electronically controllable pneumatic brake system includes a service brake control module for controlling a first and a second service brake circuit, and a trailer control module with a trailer brake pressure connection point for connection to a trailer brake pressure coupling head. The trailer control module outputs a trailer brake pressure via the trailer brake pressure connection point. Upon a malfunction of the first and/or second service brake circuit, the first service brake pressure is controlled depending on the trailer brake pressure; and the second service brake pressure is controlled depending on the trailer brake pressure specified by the trailer control module; and/or the parking brake pressure is controlled directly or depending on the trailer brake pressure specified by the trailer control module. Upon
(Continued)

a malfunction of the trailer control module, the trailer brake pressure is controlled depending on the first service brake pressure.

22 Claims, 3 Drawing Sheets

(51) Int. Cl.
  *B60T 7/12* (2006.01)
  *B60T 13/26* (2006.01)
  *B60T 13/38* (2006.01)
  *B60T 13/62* (2006.01)
  *B60T 13/68* (2006.01)
  *B60T 17/22* (2006.01)
(52) U.S. Cl.
  CPC .............. *B60T 13/38* (2013.01); *B60T 13/62* (2013.01); *B60T 13/683* (2013.01); *B60T 17/22* (2013.01); *B60T 2270/402* (2013.01); *B60T 2270/403* (2013.01); *B60T 2270/404* (2013.01); *B60T 2270/413* (2013.01); *B60T 2270/82* (2013.01)
(58) Field of Classification Search
  CPC ............. B60T 2270/403; B60T 13/263; B60T 2270/413; B60T 2270/402; B60T 2270/82; B60T 2270/404; B60T 13/683; B60T 8/1708

See application file for complete search history.

(56) References Cited

U.S. PATENT DOCUMENTS

| | | | |
|---|---|---|---|
| 11,370,404 B2* | 6/2022 | Michaelsen | B60T 13/683 |
| 11,377,079 B2* | 7/2022 | Van Thiel | B60T 13/74 |
| 2022/0144232 A1* | 5/2022 | Van Thiel | B60T 17/22 |

FOREIGN PATENT DOCUMENTS

| | | |
|---|---|---|
| DE | 102008003379 A1 | 7/2009 |
| DE | 102015008377 A1 | 12/2016 |
| EP | 1561661 A1 | 8/2005 |
| EP | 2090481 A2 | 8/2009 |
| EP | 3626559 A1 * | 3/2020 |
| EP | 3626562 A1 * | 3/2020 |
| FR | 2369954 A1 | 6/1978 |

OTHER PUBLICATIONS

European Patent Office, Rijswijk, Netherlands, International Search Report of International Application No. PCT/EP2018/056950, dated Jun. 26, 2018, 2 pages.

* cited by examiner

ELECTRONICALLY CONTROLLABLE BRAKE SYSTEM AND METHOD OF ELECTRONICALLY CONTROLLING THE BRAKE SYSTEM

TECHNICAL FIELD

The invention relates to an electronically controllable brake system as well as a method for controlling the electronically controllable brake system. Such an electronically controllable brake system comprises at least: a service brake control module for controlling at least a first and a second service brake circuit, the first service brake circuit with first service brakes, wherein a first service brake pressure can be delivered to the first service brakes and the service brake control module is designed to generate a first service brake control signal depending on a braking demand, wherein the first service brake pressure can be generated depending on the first service brake control signal and can be specified for the first service brakes for the implementation of the braking command electrically controlled by the service brake control module via the at least one first service brake circuit, the second service brake circuit with second service brakes, wherein a second service brake pressure can be delivered to the second service brakes and the service brake control module is designed to generate a second service brake control signal depending on the braking command, wherein the second service brake pressure can be generated depending on the second service brake control signal and can be specified for the second service brakes for the implementation of the braking command electrically controlled by the service brake control module via the at least one second service brake circuit; a parking brake circuit with parking brakes, wherein the parking brakes can be clamped for parking braking and/or auxiliary braking of the vehicle; and a trailer control module with a trailer brake pressure connection point for connection to a trailer brake pressure coupling head, wherein the trailer control module is embodied to generate a trailer brake pressure and to output the trailer brake pressure via the trailer brake pressure connection point.

BACKGROUND

A brake system in a vehicle, preferably a commercial vehicle, may be fitted with two or more service brake circuits in which a service brake pressure controlled at service brakes is adjusted and a parking brake circuit in which a parking brake pressure controlled at spring brakes is adjusted. The service brake pressure is controlled at the service brakes, for example, by a pressure modulator, which outputs a service brake pressure to the respective service brakes according to a service brake braking command in the form of a pneumatic service brake control pressure or an electrical service brake control signal.

In normal operation, the command to the pressure modulator is passed electrically via the service brake control signal, wherein the service brake control signal is determined by a service brake control module depending on a manually specified service brake braking command and/or depending on an assistance braking command automatically requested by an assistance system and is output. In the event of redundancy, for example in the event of an electrical failure of the service brake control module, the command to the pressure modulator is made by the service brake control pressure, which is specified to the pressure modulator via a pneumatic redundancy connection point and which, for example, is output depending on the service braking brake command by a service brake actuator implemented as an electro-pneumatic service brake valve with a brake pedal.

The main purpose of the parking brake circuit is to park the vehicle in a parking situation or to perform auxiliary braking or for emergency braking while travelling by controlling a parking brake pressure controlled by a parking brake control module, depending on which the spring brakes are clamped, wherein the parking brake pressure is reduced for clamping. By way of example, such a parking brake control module or holding brake module is described in DE 10 2015 008 377 A1. Traditionally, the parking brake circuit and the service brake circuits operate separately from each other. In certain applications, it is possible to replace the redundancy mechanism of the service brake described above with alternative control of the parking brake circuit. For this purpose, the electrical power supply of the parking brake must usually be carried out independently of the power supply of the service brake.

In the event of a failure of the electrical control of the service brake circuits by the service brake control module, a pneumatic first fallback level controlled by the driver can be formed as described. However, if the driver is not available as a fallback level, for example because he is inattentive or is out of place in the case of highly automated driving maneuvers, a second level of fallback can be formed, which can intervene automatically and under electronic control, wherein the existing parking brake circuit is used for this purpose. After detecting the electrical failure in one of the service brake circuits, the automated braking command is fed to the parking brake control module, which can actuate the spring brakes accordingly by specifying the parking brake pressure in order to compensate for the electrical failure of the service brakes. Alternatively, the automated braking command can be permanently fed to the parking brake control module and, if a failure in at least one of the service brake circuits is detected by the parking brake control module, the parking brake control module can operate the spring brakes accordingly by commanding the parking brake pressure. In this case, however, sometimes only one axle of the vehicle on which the spring brakes are disposed in the parking brake circuit may be braked. This may result in limited deceleration performance and possibly additional instability while travelling.

To avoid this, EP 2 090 481 B1 describes an electronically controllable brake system in which a rear-axle service brake circuit is controlled by a rear-axle service brake control module and a front-axle service brake circuit is controlled by a front axle service brake control module. The parking brake control module for the parking brake circuit is integrated within the front-axle service brake control module, wherein the parking brake circuit controls spring brakes on the rear axle. The rear-axle service brake control module and the components of the rear-axle service brake circuit are supplied with energy by a first energy source and the front-axle service brake control module as well as the parking brake control module with the correspondingly assigned components are supplied with energy from a second energy source.

In the event of a failure of the first energy source, i.e. for the rear-axle service brake circuit with the service brakes on the rear axle, the front axle can be further braked by the front axle service brake circuit and the rear axle by the parking brake circuit, so that both the vehicle axles can be braked. The parking brake circuit thus compensates for the failure of the rear-axle service brake circuit by braking with the spring brakes on the rear axle instead of the service brakes. In the event of a failure of the second energy source, i.e. of both the parking brake circuit on the rear axle and the front axle service brake circuit, a service brake control signal is output from the rear-axle service brake control module, which, as in normal operation, is transmitted to the rear axle pressure modulator but also additionally to a trailer control valve of the vehicle. The trailer control valve generates a corresponding control pressure that is transferred to the trailer, if any, in order to cause braking there, and at the same time via a redundancy pressure line to the pneumatic redundancy connection point on the front axle pressure modulator. The rear axle and the front axle are thus braked by the service brakes, as in normal operation, wherein the front axle is also controlled by the rear axle service brake control module.

The parking brake control module can continue to output a parking brake control pressure to the trailer control valve, which inverts the pressure and forwards it to the service brakes of the trailer in order to be able to implement a parking brake function in the trailer.

Thus, in the prior art it is proposed to control each service brake circuit via separate control modules and to compensate for a failure of an energy source and thus at least one service brake circuit by the fact that the still functioning brake circuit or brake circuits applies or apply braking to the failed vehicle axle, so that both vehicle axles can still be used for braking even in a redundancy situation.

The disadvantage here is that no such compensation can take place in electronically controlled brake systems that control the service brakes on the rear axle and the front axle and possibly other vehicle axles via the pressure modulator and via only one central service brake control module, since in the event of a failure of the energy source or individual electrical components of the respective service brake circuit, the central service brake control module can no longer carry out the electrical control of the service brakes or the upstream pressure modulators on individual vehicle axles. Thus, if available in the appropriate brake system, the pneumatic first fallback level controlled by the driver can only be reverted to if the driver actually intervenes manually. However, a purely electronic braking command as described in EP 2 090 481 B1 or a possible automatically specified assistance braking command can no longer be implemented.

SUMMARY

It is therefore the object of the invention to specify an electronically controllable brake system and a method for controlling the electronically controllable brake system, which provides electrically redundant control of the service brakes on both vehicle axles in a simple and reliable manner, even if the respective service brake circuits are controlled by a common service brake control module and even if the braking command is issued purely electronically.

According to the invention, it is therefore provided that a) in the event of a malfunction of the first and/or second service brake circuit: the first service brake pressure can be controlled depending on the trailer brake pressure specified by the trailer control module at the first service brakes of the at least one first service brake circuit; and the second service brake pressure can be controlled depending on the trailer brake pressure specified by the trailer control module at the second service brakes of the at least one second service brake circuit and/or the parking brake pressure can be controlled directly or by the trailer control module; and/or b) in the event of a malfunction in the trailer control module: the trailer brake pressure can be controlled at the trailer brake pressure coupling head depending on the first or second service brake pressure.

The electrically controlled implementation of the braking command is not possible, for example, in the event of an electrical failure in at least one of the service brake circuits. In the context of the invention, an electrical failure includes in particular the case that generation of the service brake control signal in the service brake control module fails, for example because the service brake control module has an electrical defect, and therefore it is not possible to specify the service brake pressure depending on the service brake control signal, which does not exist in this case. Furthermore, an electrical failure may exist if a service brake control signal can be generated and output by the service brake control module, but the signal cannot be converted into a service brake pressure, for example due to an electrical defect in any electrical component (for example, a pressure modulator of an electric brake sensor) of the relevant service brake circuit.

According to the invention, therefore, it is provided that in the event that the service brake control module fails, for example, the first service brake pressure at the first service brakes of the at least one first service brake circuit can be controlled depending on the trailer brake pressure specified by the trailer control module. The first service brake circuit is preferably provided for the front axle of the vehicle. The trailer control module controls the trailer brake pressure via the trailer brake pressure connection point. The trailer brake pressure is used to actuate the service brakes of the trailer. According to the invention, therefore, the trailer brake pressure or a pressure derived therefrom is controlled at the first service brakes of the first service brake circuit. In this case, the first service brake pressure is pneumatically controlled by the trailer control module.

At the same time, the second service brake pressure is controlled at the second service brakes of the at least one second service brake circuit, depending on the trailer brake pressure specified by the trailer control module. In addition or alternatively, the parking brakes are applied depending on the trailer brake pressure controlled by the trailer control module.

The parking brakes can be spring brakes, electromechanical parking brakes or purely electric parking brakes. In the case of electromechanical parking brakes or purely electrical parking brakes, an electrical signal is preferably provided at the parking brakes by the trailer control module, and the parking brakes are designed to be applied depending on receiving the signal. The signal can also be provided by a pressure sensor, which detects the trailer brake pressure controlled by the trailer control module and provides the signal at the parking brakes or at a module controlling the parking brakes.

Preferably, the parking brakes are embodied as spring brakes and a parking brake pressure can be applied to the spring brakes, wherein in the event of a malfunction of the first and/or second service brake circuit the parking brake pressure can be controlled by the trailer control module directly or depending on the trailer brake pressure. In this case, the parking brake pressure is preferably additionally or alternatively controlled by the trailer control module. The second service brake circuit is preferably the brake circuit for the rear axle of the vehicle. Spring brakes are typically disposed on the rear axle of the vehicle. It may therefore be preferred to control a parking brake pressure at the spring brakes instead of the second service brake pressure in order to use the spring brakes in the event of a fault instead of the service brakes of the second service brake circuit. It may be provided that the parking brake pressure is directly controlled by the trailer control module, or the parking brake pressure is controlled depending on the trailer brake pressure specified by the trailer control module, for example specified to a parking brake control module of the parking brake circuit.

In this way, in the event of a malfunction of the first and/or second service brake circuit, both the first service brakes of the first service brake circuit and the second service brakes of the second service brake circuit or the parking brakes are controlled redundantly. If only one of the service brake circuits fails, it is also preferable to apply only the first or second service brakes or the corresponding parking brakes.

Furthermore, according to the invention it is additionally or alternatively provided that in the event of a malfunction of the trailer control module the trailer brake pressure at the trailer brake pressure coupling head can be controlled depending on the first service brake pressure. Preferably, the trailer brake pressure can be controlled at the trailer brake pressure connection point depending on the first service brake pressure. In this case, reverse redundancy is used as the fallback level: the first service brake pressure is used as the control pressure for the trailer brake pressure, so that the trailer control module can control the trailer brake pressure at the trailer brake pressure coupling head depending on the first service brake pressure. In this case, the first service brake pressure is supplied to the trailer control module as a pneumatic redundancy pressure.

In this way, mutual redundancy is achieved. If the service brake circuits of the vehicle fail, the control of the service brakes or the spring brakes of the vehicle is carried out by the trailer control module, namely via the trailer brake pressure. In the opposite case, the trailer brake pressure is controlled using the first and second service brake circuits if it is not possible to control the trailer brake pressure independently by the trailer control module. Such reciprocal redundancy increases safety.

According to a preferred embodiment, the trailer control module comprises a redundancy output, wherein the trailer control module is embodied to output the trailer brake pressure via the redundancy output. In one variant, a junction is provided on a line connected to the trailer brake pressure connection point, which leads to the trailer brake pressure coupling head. The trailer brake pressure is output redundantly via the redundancy output and is preferably provided via a pneumatic line to the first and/or second service brake circuit. It is not necessary for the trailer control module to have a separate redundancy output, similarly a junction can be provided in a line connecting the trailer brake pressure connection point to the trailer brake pressure coupling head in order to tap the trailer brake pressure. Preferably, the trailer control module comprises a shut-off valve to prevent control of the trailer brake pressure at the redundancy output. The shut-off valve preferably has a first and a second switching position, wherein it is open in the first switching position and closed in the second switching position. Preferably, the shut-off valve is electrically controlled and is deenergized in the first switching position. The shut-off valve is preferably controlled by the service brake control module, so that it is energized in error-free operation. The trailer brake pressure is preferably generated by the trailer control module during the operation of the vehicle by receiving a braking command, preferably an electronic braking command of an electrical braking indicator.

Alternatively or additionally, it is also possible to generate the trailer brake pressure based on the parking brake pressure and/or a parking brake control pressure that predetermines the parking brake pressure and that is to be controlled in order to implement the braking command in the parking brake circuit by the spring brakes. This variant is particularly preferred for so-called "European trailer control". In this case, it is necessary to brake the trailer in synchronism with the spring brakes when the vehicle is parked. If the spring brakes are clamped, i.e. discharged, the trailer should be braked at the same time by the service brakes, which requires control of the trailer brake pressure. For this purpose, the trailer control module preferably comprises an inverse relay valve, which controls the inversion of the parking brake pressure or a parking brake control pressure determining the parking brake pressure as the inverse of a trailer brake pressure. This is necessary because the spring brakes act inversely as described above. In the context of the invention, an inversion is understood in the context of the invention to mean that the trailer control module or an inverse relay valve ensures that a trailer brake pressure that is inversely proportional to the parking brake pressure and/or the parking brake control pressure is produced and output. This can advantageously be achieved in that a parking brake pressure and/or a parking brake control pressure, which can be generated in the parking brake circuit for the control of the spring brakes, each of which characterizes the braking command specified to the parking brake circuit, can be used following the inversion to directly control the service brakes of the trailer and to implement the braking command in at least one service brake circuit. This means that, depending on the inverted parking brake pressure and/or the inverted parking brake control pressure, the service brakes in the service brake circuits achieve roughly the same braking effect as the spring brakes in the parking brake circuit depending on the parking brake pressure and/or the parking brake control pressure. Thus, in the event of an electrical failure in the service brake circuits, an elaborate pressure control system for generating the service brake pressure can be dispensed with.

The trailer control module can also provide scaling, i.e. the braking effect at the service brakes can be scaled by a factor compared to the braking effect at the spring brakes, i.e. can be increased or reduced, for example to improve the driving stability of the vehicle when braking. Furthermore, the trailer brake pressure may be provided only to a service brake circuit, in particular the first service brake circuit (for example a front axle service brake circuit), or also to other service brake circuits (for example a rear-axle service brake circuit) in the vehicle if there is an electrical failure and the failure is to be compensated by braking on other vehicle axles with service brakes. The embodiment versions described below are accordingly to be provided on only one vehicle axle or if necessary also on other vehicle axles or in further service brake circuits in the identical manner.

In the context of the invention, the braking command can be an automatically requested assistance braking command, which is automatically generated by an assistance control module. The assistance control module is provided to automatically control the vehicle based on environment information, wherein the vehicle can be automatically braked on the basis of the assistance braking command and the assistance braking command can be implemented both by the first and second service brake circuits and preferably also by the parking brake circuit. Furthermore, the braking command can be a parking brake braking command manually requested by the driver via a parking brake control device and/or a service brake braking command manually requested via an electrical braking indicator (electric brake pedal), which can also be redundantly specified to the service brakes in the respective service brake circuit by the trailer control module for implementation and vice versa.

In the event of an electrical failure of the at least one first or second service brake circuit, the parking brake circuit or the trailer control module, it may be provided in the context of redundant braking to control the respective braking commands to the respective still functioning brake circuits in order to compensate for the electrical failure. This can be ensured by appropriate networking of the respective components, for example via any in-vehicle (bus) network or CAN bus or via a direct connection of the individual components. Accordingly, all of the above braking commands can serve as redundant braking commands in each of the brake circuits, which, in the event of an electrical failure of one of the service brake circuits, can be controlled in the brake system via the parking brake circuit and can be controlled at the at least one service brake circuit via the inverter control valve.

According to a preferred embodiment, the electronically controllable brake system comprises an electronic brake indicator, which is connected to the service brake control module and the trailer control module to transmit a manually specified service brake braking command. The electronic brake indicator is preferably designed as an electronic brake pedal. According to this embodiment, the vehicle has no pneumatic brake pedal and no electro-pneumatic brake pedal that can also redundantly control a pneumatic braking command in addition to an electronic braking command. The electronic brake indicator is connected to the service brake control module via a first signal line and to the trailer control module via a second signal line. Hereby, the electronic service brake braking command is output redundantly. On the one hand, the service brake control module receives the service brake braking command, and on the other hand, the trailer control module receives the service brake braking command. In the event that the service brake control module fails, the service brake braking command can still be processed by the trailer control module; in the opposite case, if the trailer control module fails, the service brake braking command can still be implemented by the service brake control module. Redundant control is thus achieved thereby.

The trailer control module is preferably embodied to implement the service brake braking command and to control the trailer brake pressure depending on the service brake braking command. For this purpose, the trailer control module preferably comprises its own electronic control unit, which receives a corresponding service brake signal and switches one or more electromagnetic valves accordingly in order to adjust the trailer brake pressure at the brake pressure connection point and/or at the redundancy output. The control can optionally be carried out with increased air volume. The parking brake circuit in the electronically controllable brake system may, according to a first alternative, comprise a parking brake control module that generates the parking brake pressure depending on the braking command, wherein the braking command in this alternative is electrically transmitted to the parking brake control module. The parking brake control module is connected to the spring brakes of the parking brake circuit in order to transfer the parking brake pressure pneumatically to the spring brakes. This means that there is an electrically controlled parking brake.

The braking command to the parking brake circuit can be an automatically requested assistance braking command in the context of the invention, which is automatically generated by the assistance control module. Furthermore, the braking command can be a parking braking command manually requested by the driver via a parking brake activation device.

Preferably, the parking brake control module of the electrically controlled parking brake is also connected to the trailer control module to pneumatically transfer the parking brake pressure or a related pressure, for example a control pressure internally generated in the parking brake control module, to the trailer control module, wherein the pressure is inverted therein and output as a trailer brake pressure.

According to an alternative embodiment, a conventional, purely pneumatic parking brake is provided, wherein a parking brake valve is disposed in the parking brake circuit, which can be manually operated by the driver to request the parking brake command. Depending on the parking brake command, the parking brake valve outputs a parking brake control pressure, the air volume of which is boosted in a relay valve and which is then output to the spring brakes as a parking brake pressure in order to implement the parking brake command. The parking brake control pressure output by the parking brake valve or a related pressure is preferably transmitted to the trailer control module via a pressure line for a redundancy situation and is inverted by the inverse relay valve in order to specify the trailer brake pressure.

Thus, in two alternatives, a parking brake braking command can be transmitted via a pneumatic parking brake or a parking brake braking command and/or an assistance braking command and/or a service brake braking command can be transmitted via an electric parking brake in the parking brake circuit to the trailer control module. In the event of an electrical failure of the first and/or second service brake circuit, the parking brake circuit in the vehicle can therefore be used to receive a braking command in the form of the manual parking brake braking command and/or the service brake braking command and/or the automatically requested assistance braking command and to redirect the command(s) to the service brakes via the trailer control module and thus to control the service brakes redundantly.

According to a further preferred embodiment, the parking brake control module may also be integrated within the trailer control module and the assistance braking command and/or the parking brake braking command and/or the service braking command can be electrically transmitted to the trailer control module, for example via a (bus) network and/or a direct connection. In the trailer control module, the parking brake pressure can be generated via the parking brake control module from the assistance braking command and/or the parking brake braking command and can be transmitted to the spring brakes via a parking brake output on the trailer control module if braking via the spring brakes is desired.

Via an electronic control unit integrated within the trailer control module, which preferably jointly controls the trailer control module and the parking brake control module, and an integrated input control module with electrically controllable pressure valves, the trailer brake pressure can be generated under electronic control from the assistance braking command and/or the parking brake braking command and/or the service brake braking command and can be output to the trailer brake pressure connection point, wherein the parking brake pressure generated in the parking brake control module is inversely proportional to the trailer brake pressure generated by the input control module. The resulting trailer brake pressure is then also used redundantly to control the service brakes of the first and/or second service brake circuits.

In order to be able to control the trailer brake pressure output by the trailer control module via the trailer brake pressure connection point at the service brakes in the event of an electrical failure of the service brake circuits and thus to feed the trailer brake pressure into the respective service brake circuit, a redundancy pressure line emanating from the trailer brake pressure connection point or from the redundancy output leads to the respective service brake circuits. The position of the feed into the respective service circuit can be defined as follows:

First, a first pressure modulator is disposed in the at least one first service brake circuit, wherein the first pressure modulator comprises a first pressure modulator output and the first pressure modulator is embodied to generate a first pressure modulator output pressure depending on the first service brake control signal and to output the pressure via the first pressure modulator output, wherein the first pressure modulator output pressure can be transmitted to the first service brakes as the first service brake pressure; and in which a second pressure modulator is disposed in at least one second service brake circuit, wherein the second pressure modulator comprises a second pressure modulator output and the second pressure modulator is embodied to generate a second pressure modulator output pressure depending on the second service brake control signal and to output the pressure via the second pressure modulator output, wherein the second pressure modulator output pressure can be transferred to the second service brakes as the second service brake pressure. This is the case in normal operation, i.e. without an electrical failure in the service brake circuits of the brake system.

According to one embodiment, the first pressure modulator comprises a first pneumatic redundancy pressure connection point, wherein the trailer brake pressure can be specified as the first redundancy pressure at the first pneumatic redundancy pressure connection point. The supply of the trailer brake pressure into the first service brake circuit can thus be carried out according to this version via the pneumatic redundancy pressure connection point to the first pressure modulator.

The optional command of the redundancy pressure is preferably carried out via a redundancy valve, which is connected upstream and/or downstream of the redundancy pressure connection point, wherein the redundancy valve can be placed in two redundancy valve switching positions and in a first redundancy valve switching position the redundancy valve blocks the trailer brake pressure generated in the trailer control module as a redundancy pressure; and in a second redundancy valve switching position the trailer brake pressure generated in the trailer control module as a redundancy pressure can be released to the first redundancy pressure connection point for redundant control of the pressure modulator. Typically, a pressure modulator has a downstream redundancy valve at the redundancy pressure connection point. The redundancy pressure connection point of the first pressure modulator is connected to a pneumatic redundancy pressure connection point of an electropneumatic or pneumatic brake pedal in the usual embodiments known in the prior art. However, since a purely electrical brake pedal is used in the context of the invention, the redundancy pressure connection point of the first pressure modulator is free and according to the invention is connected to the redundancy output of the trailer control module or to the trailer brake pressure connection point.

In addition to the internal, downstream redundancy valve, an upstream redundancy valve may be provided. The additional redundancy valve can be used to prevent the first service brakes of the first service brake circuit from being permanently applied in the parked vehicle in the so-called "European trailer control". The control of the first service brake pressure via the first redundancy pressure connection point of the first pressure modulator should only be carried out in the event of a fault if the first and/or second service brake circuit is disrupted. In this case, the first pressure modulator is usually deenergized. The downstream redundancy valve of the first pressure modulator is preferably configured to be open when deenergized, so that in the deenergized state of the first pressure modulator the trailer brake pressure can be controlled as a redundancy pressure at the first pressure modulator and so that the first service brake pressure at the first service brakes can be controlled via the first redundancy pressure connection point on the first pressure modulator.

However, when the vehicle is parked the first pressure modulator is also deenergized. In the case of the "European trailer control", the trailer is permanently braked by the service brakes of the trailer, which means that a trailer brake pressure is permanently controlled at the trailer brake pressure connection point of the trailer control module. If in this case the first redundancy pressure connection point of the first pressure modulator is connected to the trailer brake pressure connection point of the trailer control module, the trailer brake pressure is permanently applied to the first redundancy pressure connection point when the vehicle is parked. This pressure can be blocked by the additional upstream redundancy valve, so that the first service brakes of the first service brake circuit are not braked when the vehicle is parked. The upstream redundancy valve is therefore preferably configured to be closed when deenergized. Preferably, the upstream redundancy valve is therefore supplied by an electrical source that is independent of the first service brake circuit, so that it is not switched to be deenergized in the event of fault in the first service brake circuit.

Furthermore, it is preferred that the second pressure modulator comprises a second redundancy pressure connection point and the trailer brake pressure can be specified as the redundancy pressure for the second redundancy pressure connection point. This enables the pressure of the second service brakes of the second service brake circuit to also be controlled redundantly via the trailer brake pressure. As already described above, it is alternatively possible to use the spring brakes for the second service brake circuit. This embodiment is preferred in the event that the second service brake circuit has no spring brakes or it is desired that the second service brakes of the second service brake circuit are controlled redundantly in the event of a fault. Just as described in relation to the first pressure modulator, it is possible to connect a second redundancy pressure valve to the second redundancy pressure connection point upstream and/or downstream of the second pressure modulator. The functionality of the second upstream redundancy valve and/or the second downstream redundancy valve corresponds to the first and second upstream and downstream redundancy valves as described above. In this respect, full reference is made to the above description.

The first and/or second pressure modulator is preferably embodied to generate the first or second pressure modulator output pressure depending on the trailer brake pressure optionally supplied to the first or second redundancy pressure connection point if a command of the service brake pressure depending on a service brake control signal that is already available from the service brake control module is not possible, i.e. if there is an electrical failure in the respective first and/or second service brake circuit. The service brake control signal is usually provided by the service brake control module depending on receiving a braking command at the first and/or second pressure modulator.

According to a further preferred embodiment, the trailer control module comprises a third redundancy pressure connection point, wherein the first or second service brake pressure can be controlled at the third redundancy pressure connection point as the third redundancy pressure, wherein the trailer control module is embodied to control the trailer brake pressure at the trailer brake pressure connection point depending on the third redundancy pressure. This creates a second level of fallback. This control of the trailer brake pressure is provided in case a malfunction occurs in the trailer control module. In this case, the trailer control module is usually deenergized and cannot control the trailer brake pressure based on a braking command of the electrical brake indicator. In this case, the trailer brake pressure is generated redundantly, based on the first service brake pressure of the first service brake circuit or the second service brake pressure of the second service brake circuit, which is applied to the third redundancy pressure connection point of the trailer control module, preferably via a pressure line. The pressure line leading to the third redundancy pressure connection point may, for example, be a branch line of a service brake pressure line of the first or second pressure modulator.

As described with reference to the first and second redundancy pressure connection points of the first and second pressure modulators, a third upstream redundancy valve and/or a third downstream redundancy valve can be provided at the third redundancy pressure connection point. The third upstream and/or downstream redundancy valve is preferably embodied to be normally open and dependent on the trailer control module. In the event that the trailer control module is deenergized, the third upstream and/or downstream redundancy valve preferably opens, so that the first service brake pressure can be controlled at the third redundancy pressure connection point as the third redundancy pressure.

In order to be able to perform control of the respective pressures in the respective brake circuits, it is preferably provided that the at least one first and second service brake circuits are supplied with energy from a first energy source, and the trailer control module is supplied with energy from a second energy source, wherein the first energy source is independent of the second energy source. This is to ensure that in the event of a failure of the first energy source for the service brake circuits, the trailer control module can continue to control pressures in order to specify the trailer brake pressure to the failed service brake circuit(s) and vice versa.

According to a second aspect of the invention, the above-mentioned object is achieved by a vehicle, in particular a commercial vehicle, with an electronically controllable brake system according to any one of the above described preferred embodiments of an electronic controllable brake system according to the first aspect of the invention.

Furthermore, the above-mentioned object in a third aspect of the invention is achieved by a method for controlling an electronically controllable brake system according to any one of the above described preferred embodiments of an electronically controllable brake system according to the first aspect of the invention, wherein the method has at least the following steps:

Determining whether the braking command can be implemented under electrical control by the service brake control module and via at least one first service brake circuit and the at least one second service brake circuit;

Generating the trailer brake pressure in the trailer control module depending on a braking command specified for the trailer control module; and if a braking command that is implemented under electrical control by the service brake control module is prevented by the at least one first service brake circuit and/or the at least one second service brake circuit:

Generating the first service brake pressure in the at least one first service brake circuit depending on the trailer brake pressure generated in the trailer control module; and/or Generating the second service brake pressure in the at least one second service brake circuit depending on the trailer brake pressure generated in the trailer control module and/or clamping the parking brakes.

In the case in which the parking brakes are embodied as spring brakes and a parking brake pressure can be delivered to the spring brakes, the clamping of the parking brakes preferably includes: generating the parking brake pressure depending on the trailer brake pressure generated in the trailer control module.

This means that a check is carried out as to whether the braking command, which can come from an electrical brake indicator or an assistance control unit, for example, can be implemented by the service brake control module. This cannot be done, for example, if there is an error in the service brake control module or in other parts of the first and/or second service brake circuit, which results in parts of or the entire first and second service brake circuit being deenergized. In the event that it is determined that the service brake control module is not able to implement the braking command, the first service brake pressure in the first service brake circuit shall be determined in accordance with the generated trailer brake pressure. This means that the trailer brake pressure, which can still be controlled in this case, is used as a redundancy pressure for the first service brake pressure. Preferably, the second service brake pressure is also controlled depending on the generated trailer brake pressure. This means that the trailer brake pressure is also used as a redundancy pressure for the second service brake pressure. As an alternative to the control of the second service brake pressure, the parking brake pressure is controlled depending on the trailer brake pressure generated in the trailer control module. In this case, therefore, in the event that the service brake control module cannot control the service brake pressure, the parking brakes are used to brake the vehicle instead of the second service brakes.

The method also preferably has the steps: determining whether the braking command can be implemented by the trailer control module; and if implementation of the braking command electrically controlled by the trailer control module is prevented:

Generating the trailer brake pressure depending on the first or second service brake pressure at the trailer brake coupling head.

According to this embodiment of the method, therefore, a reverse redundancy is obtained: In the event that the braking command cannot be implemented by the trailer control module and the trailer cannot therefore be supplied with an electrically controlled trailer brake pressure from the trailer control module, the trailer brake pressure is controlled redundantly by using the first or second service brake pressure as a redundancy pressure. It may be provided that the first or second service brake pressure is provided directly at the trailer brake pressure coupling head as the trailer brake pressure. In this case, an air volume boost is required, since the air volume is significantly increased in this case compared to the normal operating case, in which only the first or second service brake pressure has to be controlled. It may also be provided that the first or second service brake pressure is fed as a redundant control pressure to the trailer control module, which then controls the trailer brake pressure in a pneumatically controlled manner. This is still possible when the trailer control module is deenergized, as pneumatic control is independent of energization of the trailer control module.

Embodiments of the invention are now described below on the basis of the drawing. This is not necessarily intended to represent the embodiments to scale, but rather the drawing, where it is used for explanation, is provided in a schematized and/or slightly distorted form. With regard to additions to the lessons that can be obtained directly from the drawing, reference is made to the relevant state of the art. It should be taken into account that various modifications and changes concerning the form and detail of an embodiment can be made without deviating from the general idea of the invention. The features of the invention disclosed in the description, drawing and claims may be essential both individually and in any combination for the further development of the invention. In addition, all combinations of at least two of the features disclosed in the description, drawing and/or claims fall within the scope of the invention. The general idea of the invention is not limited to the exact form or detail of the preferred embodiments shown and described below or limited to an object that would be limited compared to the object claimed in the claims. In the case of specified design ranges, values lying within the above limits should also be disclosed as limit values and can be used as desired and can be claimed. For simplicity, the same reference characters are used below for identical or similar parts or parts with identical or similar functions.

Further advantages, features and details of the invention result from the following description of the preferred embodiments as well as on the basis of the drawings. The drawings are provided herewith for purely illustrative purposes and are not intended to limit the scope of the present invention.

DETAILED DESCRIPTION

Figure 1:
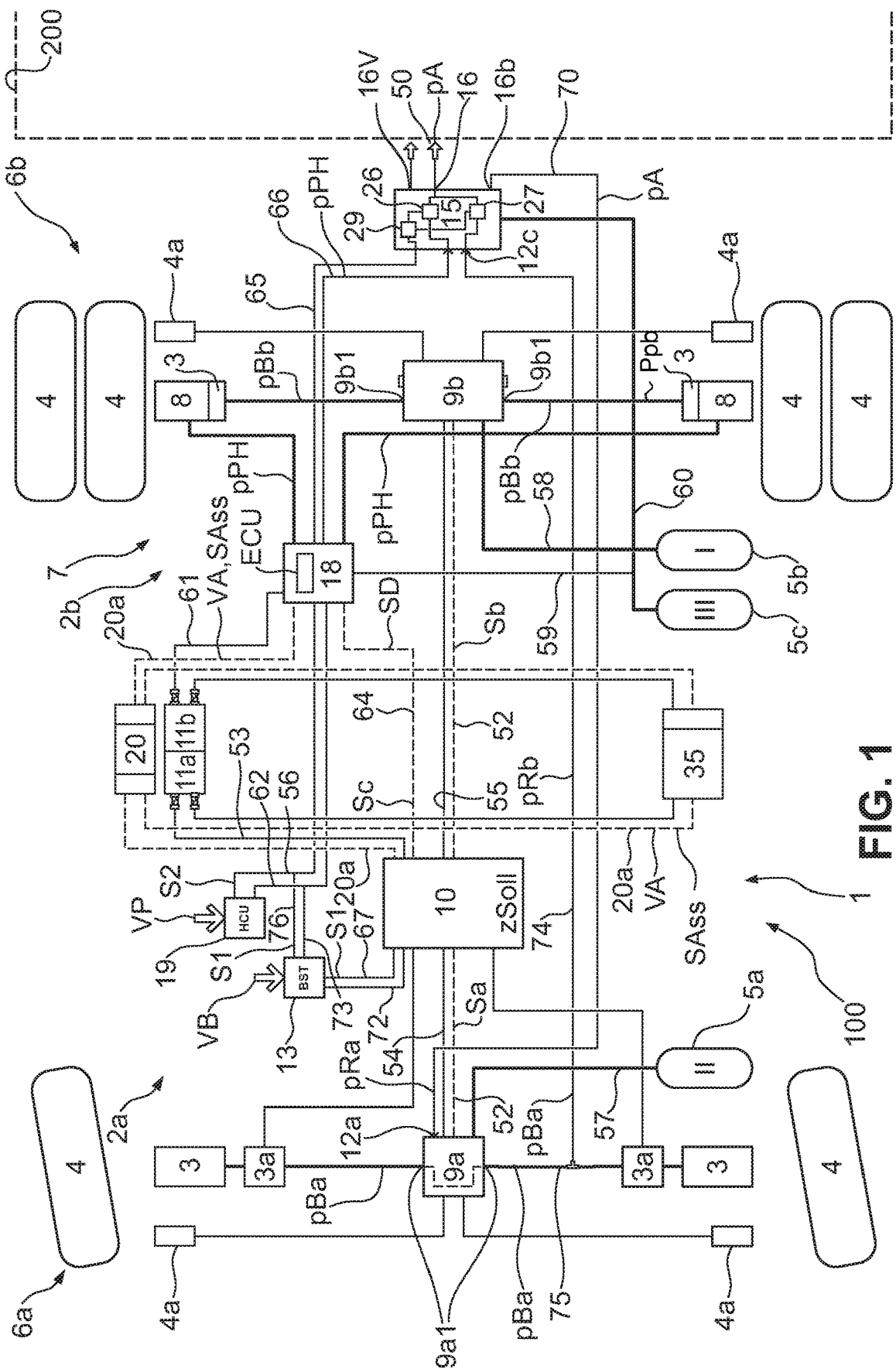
FIG. 1 shows an electronically controllable brake system according to a first exemplary embodiment with a trailer control module and a separate parking brake control module.

FIG. 1 schematically depicts a vehicle 100 with a brake system 1 that can be braked in a first service brake circuit 2a and a second service brake circuit 2b via service brakes 3 on the wheels 4. The first service brake circuit 2a is assigned here as the front axle service brake circuit of a front axle 6a and the second service brake circuit 2b is assigned as a rear axle service brake circuit of a rear axle 6b. Other vehicle axles may also be provided to which the service brake circuits 2a and 2b or other service brake circuits are assigned. Each service brake circuit 2a, 2b is assigned a first pressure medium reservoir 5a and a second pressure medium reservoir 5b according to the axle.

The rear axle 6b is further assigned a parking brake circuit 7, wherein the wheels 4 on the rear axle 6b in the parking brake circuit 7 can be braked via parking brakes 8, in this case embodied as spring brakes 8, so that the wheels 4 of the rear axle 6b can be braked both in the second service brake circuit 2b (rear-axle service brake circuit) via the service brakes 3 and in the parking brake circuit 7 via the spring brakes 8. Combined service/spring brakes are provided on the rear axle 6b for this. The parking brake circuit 7 is supplied with pressurized medium via an independent third pressure medium reservoir 5c.

For actuating the service brakes 3 and thus for the implementation of a requested braking command, which is characterized by a setpoint vehicle deceleration zSoll or a setpoint brake pressure, first and second pressure modulators 9a, 9b are disposed in each of the two service brake circuits 2a, 2b on the respective vehicle axle 6a, 6b, wherein the first and second pressure modulators 9a, 9b can be controlled electrically or pneumatically according to this embodiment in order to apply a certain service brake pressure pBa, pBb to the service brakes 3 of the respective vehicle axle 6a, 6b and thus to clamp the service brakes 3. In principle, the service brake pressure pBa, pBb can be individually specified for each of the individual service brakes 3, for example in the context of brake slip control, which is carried out on the basis of data from wheel speed sensors 4a on the individual wheels 4. On the rear axle 6b, the brake slip control can be carried out directly via the rear axle pressure modulator 9b and on the front axle 6a via ABS control valves 3a upstream of the service brakes 3.

The first pressure modulator 9a is connected via a first reservoir pressure supply line 57 to the first pressure medium reservoir 5a, and the second pressure modulator 9b is connected via a second reservoir pressure supply line 58 to the second pressure medium reservoir 5b.

In the normal driving mode, the respective pressure modulators 9a, 9b are controlled electrically via first and second service brake control signals Sa, Sb, wherein the respective service brake control signals Sa, Sb are generated in a service brake control module 10 depending on the respective braking command or the setpoint vehicle deceleration zSoll in such a way that the respective pressure modulator 9a, 9b controls a service brake pressure pBa, pBb at the service brakes 3 with which the requested braking command is implemented. The service brake control signal Sa, Sb can be output, for example, via a CAN bus, another network or an analog or pulse-width modulated control signal, with which a pressure modulator output pressure pDa, pDb is generated in a known manner in the pressure modulator 9a, 9b via pressure valves and is output via a pressure modulator output 9a1, 9b1 as a service brake pressure pBa, pBb to the respective service brake 3. In this embodiment, the first and second pressure modulators 9a, 9b are connected to the service brake control module 10 via a first CAN bus 52.

The pressure modulators 9a, 9b are thus electrically connected to the service brake control module 10, which can electrically control the braking effect in the two service brake circuits 2a, 2b individually and is thus embodied as a central control module, which is responsible in normal operation for the electrical implementation of the braking command in both service brake circuits 2a, 2b. The service brake control module 10 as well as the respective pressure modulators 9a, 9b as well as other components of the respective service brake circuits 2a, 2b are supplied with energy by a first energy source 11a according to this embodiment. For this purpose, the service brake control module 10 is connected to the energy source 11a via a first power line 53, the first pressure modulator 9a is connected to the service brake control module 10 via a second power line 54, and the second pressure modulator 9b is also connected to the service brake control module 10 via a third power line 55.

The setpoint vehicle deceleration zSoll can be set manually by the driver, who, by manually actuating the electrical braking indicator 13 for example, provides a service brake braking command VB via an electric brake pedal that is output via a service brake actuation signal S1 to the service brake control module 10 and from which the setpoint vehicle deceleration zSoll results. Furthermore, in automated driving mode, an automated assistance braking command VA can be output by an assistance control module 35 via an assistance control signal SAss, which can also be transmitted to the service brake control module 10, for example via a vehicle bus 20 with corresponding bus lines 20a or another network in the vehicle 100 and which also corresponds to a defined setpoint vehicle deceleration zSoll.

The assistance control module 35 is designed to control the vehicle 100 automatically on the basis of environment information, in particular according to the assistance braking command VA, and the assistance control signal SAss is output depending thereon, in particular to the brake system 1.

The brake system 1 also comprises a parking brake control module 18 that generates a parking brake pressure pPH in the parking brake circuit 7, for example depending on a parking brake braking command VP specified manually by the driver via a parking brake control device 19, and the pressure or a control pressure generated internally in the parking brake control module 18, depending on which the parking brake pressure pPH is generated, is output to the spring brakes 8 so that a defined braking effect on the rear axle 6b can be achieved via the spring brakes 8. For this purpose, according to FIG. 1 in the presence of a parking brake braking command VP from the parking brake control device 19 a parking brake actuation signal S2 is output to the parking brake control module 18 by electronic means and via a parking brake signal line 56. In the context of the parking braking, only complete releasing or clamping of the spring brakes 8 is provided. As an example, such a parking brake control module 18 is described in DE 10 2015 008 377 A1, the content of which is hereby fully included by reference. The parking brake control module 18 is connected to the third pressure medium reservoir 5c via a third reservoir pressure supply line 59.

The parking brake control module 18 is connected to a second energy source 11b via a fourth power line 61 and is supplied therefrom. The second energy source 11b is independent of the first energy source 11a, so that the parking brake control module 18 is supplied with electrical power even if the first energy source 11a should fail. A fifth power line 62 runs from the parking brake control module 18 to the parking brake control device 19, so that the parking brake control device 19 is also supplied by the second energy source 11b.

The electrical braking indicator 13 is also connected to the parking brake control module 18 via a braking indicator signal line 63, so that the parking brake control module 18 receives the service brake actuation signal S1.

Furthermore, the automatically specified assistance braking command VA can also be transmitted via the vehicle bus 20 and the bus line 20a or via the assistance control signal SAss to the parking brake control module 18 and can also be implemented thereby, for example within the framework of an automatically specified auxiliary braking function or an automatically specified emergency braking function or an automatically specified parking braking function. For this purpose, the parking brake pressure pPH is generated by the parking brake control module 18 depending on the automatically specified parking brake braking command VP and is controlled at the spring brakes 8 in order to provide supporting braking even while driving or parking when at a standstill using the parking brake circuit 7 and the spring brakes 8. In this context, graduated braking in the parking brake circuit 7 is also possible.

In this embodiment (FIG. 1), the parking brake control module 18 comprises an electronic control unit (ECU). Using the electronic control unit (ECU), the parking brake control module 18 is capable of determining the internal control signals for electropneumatic valves from the brake demands VA, VB and VP or the signals S1, S2, SAss and to control the parking brake pressure pPH based on the signals S1, S2, SAss. Furthermore, the parking brake control module 18 in this embodiment (FIG. 1) also handles the intelligence for a trailer control module 15. For example, the parking brake control module 18 is connected to the service brake control unit 10 via a second CAN bus 64 and receives the trailer brake pressure signal Sc, which is designed as a trailer brake pressure signal. The parking brake control module 18 is connected to the trailer control module 15 via a simple signal line 65 in order to provide signals for an input control unit 29 of the trailer control module 15 on the trailer control module 15. Furthermore, the parking brake control module 18 is pneumatically connected to the trailer control module 15 via a parking brake pressure control line 66. The trailer control module 15 is embodied to provide a trailer brake pressure pA at the trailer brake pressure connection point 16, which is provided for the trailer 200 via a pneumatic line to the trailer brake pressure coupling head 50. The trailer control module 15 is also connected to the third pressure medium reservoir 5c via a fourth reservoir pressure supply line 60.

The parking brake pressure pPH—or a related pressure—that is fed to the trailer control module 15 via the parking brake pressure control line 66 is inverted in the trailer control module 15 by an inverse relay valve 26 that is only shown schematically in FIG. 1 and is output as a trailer brake pressure pA to the trailer brake pressure connection point 16. The inversion of the parking brake pressure pPH is provided in order to be able to control service brakes, which clamp at high service brake pressures and release at low service brake pressures, with the trailer brake pressure pA. The parking brake pressure pPH, on the other hand, is output taking into account that the spring brakes 8 in the parking brake circuit 7 clamp at low parking brake pressures pPH and release at high parking brake pressures pPH.

Such an inversion function via an inverted relay valve 26 in the trailer control module 15 is already available in conventional trailer control modules, which are intended to brake a trailer 200 attached to the vehicle 100 with service brakes via a parking brake pressure pPH controlled in the parking brake circuit 7 and therefore to brake the trailer 200 in a parking situation, an auxiliary braking situation or an emergency braking situation in accordance with the parking brake braking command VP or the assistance braking command VA. An additional reservoir pressure output 16V on the trailer control module 15 is used here to transfer the pressure medium from the third pressure medium reservoir 5c to the trailer 200, wherein the reservoir pressure output 16V leads to the "red coupling head" 15a.

In order to ensure the continued implementation of the service brake braking command VB or the assistance brake command VA, i.e. the setpoint vehicle deceleration zSoll, in the event of an electrical failure, a plurality of fallback levels can be resorted to. The fallback levels ensure that the electrically controllable brake system 1 is suitable for a certain degree of automation within the scope of an electronically controlled autonomous driving operation. The fallback levels are designed as follows:

In the event that the first service brake circuit 2a and/or the second service brake circuit 2b fails, for example because the first energy source 11a is defective, a brake value signal line 67 via which the service brake actuation signal S1 is sent to the service brake control module 10 is defective, or the service brake control module 10 itself has a defect, a first redundant control of brake pressures is provided. For this purpose, a first redundancy pressure line 70 is provided, which runs from the redundancy output 16b of the trailer control module 15 to a first redundancy pressure connection point 12a of the first pressure modulator 9a. At the redundancy output 16b, the trailer brake pressure pA is provided that is also provided at the trailer brake pressure connection point 16. In this respect, it is also conceivable that no separate redundancy output 16b is provided for the trailer control module 15; similarly, the first redundancy pressure line 70 could be connected to the trailer brake pressure connection point 16 via a T-Piece or similar.

Since the parking brake control module 18 and also the trailer control module 15 are supplied by the second energy source 11b, the modules can continue to work even in the event of the failure of the first energy source 11a. The electrical brake indicator 13 is supplied by both energy sources 11a, 11b, once starting from the service brake control module 10 via a first power line 72 and once starting from the parking brake control module 18 via a second power line 73. This means that even in the event of failure of the first energy source 11a, the brake indicator 13 can still be operated and a braking command VA or the signal S1 can be provided to the parking brake control module 18.

The parking brake control module 18 can continue to transmit signals via the signal line 65 to the trailer control module 15 via the electronic control unit (ECU) thereof, and the trailer control module 15 can control a trailer brake pressure pA. The pressure is then provided via the first redundancy pressure line 70 as the first redundancy pressure pRa at the first redundancy pressure connection point 12a. The first pressure modulator 9a is designed to control the first service brake pressure pBa at the service brakes 3 redundantly and under pneumatic control depending on receiving the first redundancy pressure pRa at the first redundancy pressure connection point 12a. This means that in the redundancy case the front axle 6a is braked synchronously with the trailer 200, based on the trailer brake pressure pA.

In the event of a fault, a diagnostic signal SD is preferably provided by the service brake control module 10 to the parking brake control module 18 via the second CAN bus 64. If the parking brake control module 18 receives the diagnostic signal SD, the parking brake control module 18 automatically controls a parking brake pressure pPH for the spring brake 8 on receiving the service brake actuation signal S1 in order to control the second service brakes 3 of the rear axle 6b if the second service brake circuit 2b has also failed.

This means that in the case of the fault, the parking brake control module 18 takes over the task of the service brake control module 10 and on the one hand controls the first pressure modulator 9a redundantly via the trailer control module 15 and via the first redundancy pressure pRa and replaces the second service brakes 3 of the rear axle 6b via the spring brakes 8 of the parking brake circuit 7.

If, in the case of the fault, the parking brake actuation device 19 is actuated for additional (auxiliary) braking, braking can also be carried out. In this case, the parking brake control module 18 controls the parking brake pressure pPH for the spring brake 8 depending on receiving the parking brake control signal S2 in order to brake it in a graduated manner. The parking brake pressure pPH is also provided via the parking brake pressure control line 66 to the trailer control module 15, is inverted and is output as a trailer brake pressure pA at the trailer brake pressure connection point 16. The trailer 200 is thus additionally braked. The same trailer brake pressure pA, which is controlled based on the graduated parking brake pressure pPH, is again provided via the first redundancy pressure line 70 at the first redundancy pressure connection point 12a. Thus, the front axle 6a is also braked redundantly in the event that the parking brake actuation device 19 is actuated for additional braking.

Furthermore, in this case, a second redundancy exists in the event that the second energy source 11b or the parking brake control module 18 or the trailer control module 15 fails.

A second redundancy pressure line 74 is provided for this purpose. The second redundancy pressure line 74 branches off the service brake pressure line 75 and runs to a third redundancy pressure connection point 12c on the trailer control module 15. The first service brake pressure pBa is provided as the third redundancy pressure pRc to the trailer control module 15 via the second redundancy pressure line 74. The trailer control module 15 is embodied to control the trailer brake pressure pA at the trailer brake pressure connection point 16 depending on receiving the third redundancy pressure pRc. For this purpose, the trailer control module 15 can comprise a conventional relay valve 27, which provides the third redundancy pressure pRc with boosted air volume at the trailer brake pressure connection point 16. Even if in this embodiment the first service brake pressure pBa is controlled at the third redundancy pressure connection point 12c, in one variant the second service brake pressure pBb can also be controlled at the redundancy pressure connection point 12c. A corresponding pressure line must then be provided. It may also be provided that both the first and the second service brake pressures pBa, pBb are provided to the trailer control module 15 via two different redundancy pressure connection points.

Figure 2:
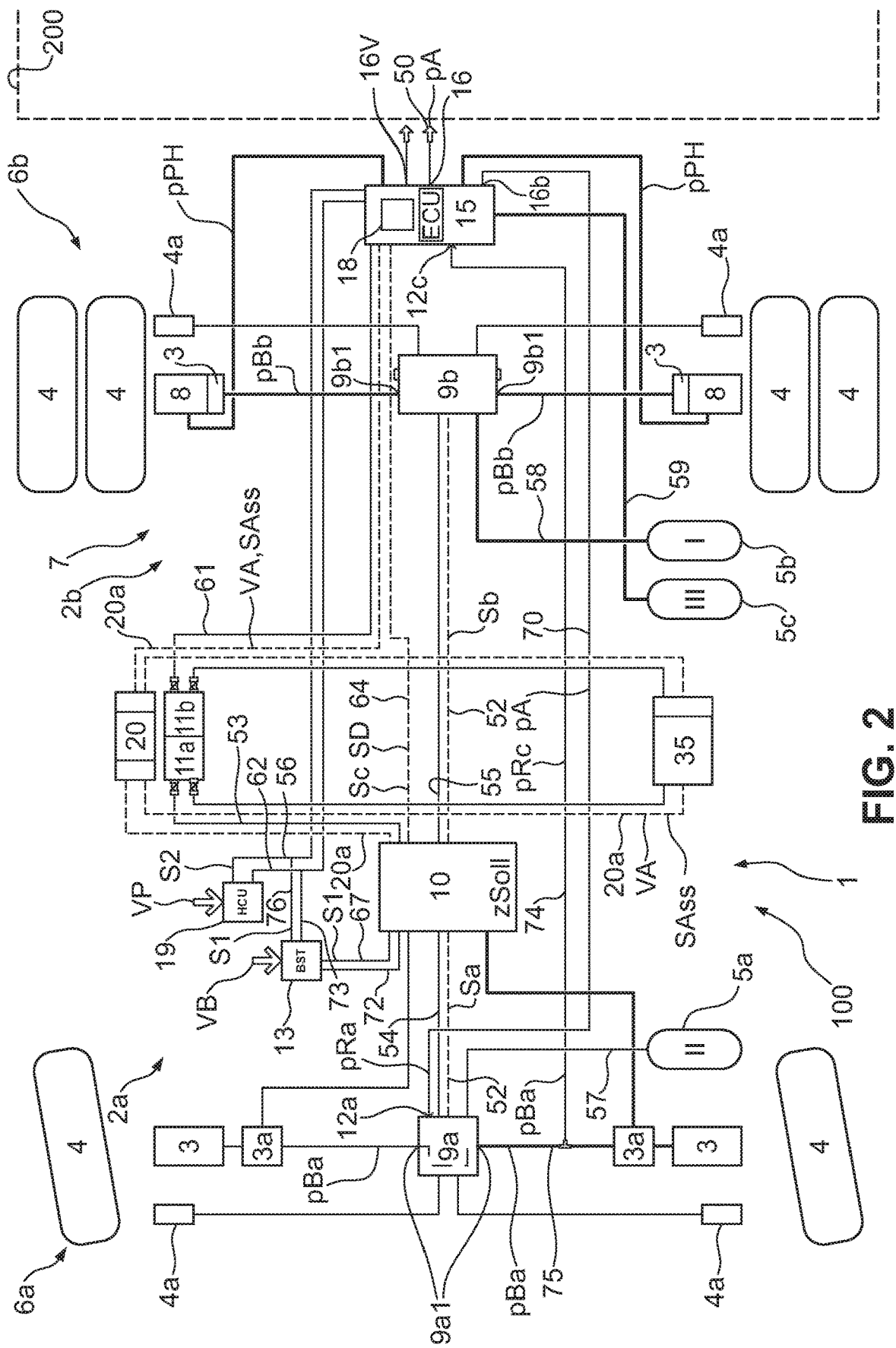
FIG. 2 shows an electronically controllable brake system according to a second exemplary embodiment with an integrated trailer control module and a parking brake control module and redundant control of the spring brakes.
Figure 3:
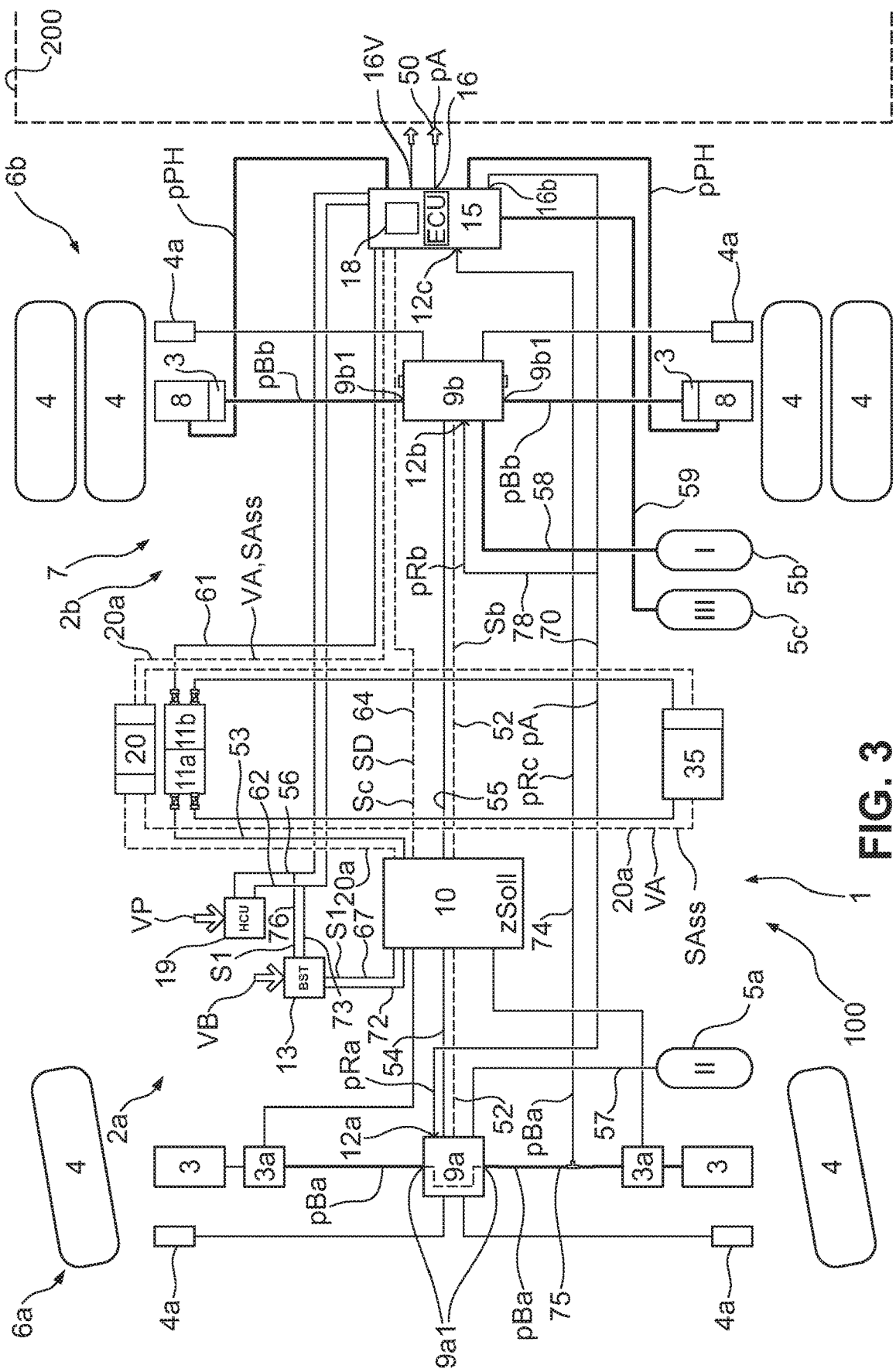
FIG. 3 shows an electronically controllable brake system according to a third exemplary embodiment with an integrated trailer control module and a parking brake control module and redundant control of the second service brakes.

The exemplary embodiments of FIGS. 2 and 3 differ from the first embodiment in particular in that the parking brake control module 18 is integrated into the trailer control module 15. In this case, they have a common electronic control unit (ECU).

In the following, the same reference characters are used for the same and similar elements, so that the description of the second and third embodiments refers in full to the first embodiment (FIG. 1). In the following, particular attention is given to the differences between the first and the second embodiments and between the second and the third embodiments.

Basically, the functionality in the second embodiment is similar to the first embodiment. The trailer control module 15 is directly connected to the electrical braking indicator 13 via the signal line 76, and not via the parking brake control module 18, and is also directly connected via the signal line 56 to the parking brake control device 19. The trailer control module 15 is supplied from the second energy source 11b via the fourth power line 61. The trailer control module 15 is connected to the service brake control module 10 via the second CAN bus 64 and thus receives the trailer brake pressure signal Sc and also the diagnostic signal Sd in the event of a fault.

A significant difference from the first embodiment (FIG. 1) is that the trailer control module 15 or the parking brake control module 18, which is integrated within the trailer control module 15, directly controls the parking brake pressure pPH for the spring brakes 8.

The first case of redundancy, in the event that the first and/or second service brake circuit 2a, 2b fails, is identical to the first exemplary embodiment with regard to the front axle 6a; the trailer brake pressure pA is controlled at the redundancy output 16b and is provided via the first redundancy pressure line 70 to the first redundancy pressure connection point 12a of the first pressure modulator 9a.

With regard to the rear axle 6b, however, there is a difference: Based on the trailer brake pressure pA, a control pressure is specified in the trailer control module 15 for the parking brake control module 18, which controls the parking brake pressure pPH depending on the trailer brake pressure pA specified by the trailer control module 15. Alternatively, it may also be provided that the common control unit (ECU) of the parking brake control module 18 and the trailer control module 15 switches the parking brake control module 18 electrically, so that the parking brake pressure pPH is controlled. Also in this exemplary embodiment, the service brakes 3 of the second service brake circuit 2b are replaced by the parking brakes 8 in the event of a fault.

The third embodiment is based on the second embodiment, and in this respect the same and similar elements are again provided with the same reference characters.

The difference between the second and third embodiments is that a third redundancy pressure line 78 is provided, which branches off from the first redundancy pressure line 70 and leads to a second redundancy pressure connection point 12b on the second pressure modulator 9b. The second pressure modulator 9b comprises a redundancy pressure connection point 12a, 12b, just like the first pressure modulator 9a. In this exemplary embodiment, both the first pressure modulator 9a and the second pressure modulator 9b are redundantly provided with the trailer brake pressure pA as the first redundancy pressure pBa or second redundancy pressure pRb. The second pressure modulator 9b is equipped to control a corresponding service brake pressure pBb at the service brakes 3 of the rear axle 6b in order to brake the rear axle 6b, depending on receiving the second redundancy pressure pRb. In this exemplary embodiment it is therefore not necessary to replace the service brakes 3 of the rear axle 6b with actuation of the spring brakes 8 in the event of a fault of the first and/or second service brake system; rather, in this exemplary embodiment the second service brake pressure pBb can be controlled redundantly depending on the trailer brake pressure pA.

While the above description constitutes the preferred embodiments of the present invention, it will be appreciated that the invention is susceptible to modification, variation and change without departing from the proper scope and fair meaning of the accompanying claims.

The invention claimed is:

1. An electronically controllable brake system (1), for a vehicle (100), comprising:

- a service brake control module (10) for controlling a first service brake circuit (2a) and a second service brake circuit (2b),
- the first service brake circuit (2a) including first service brakes (3), wherein the brake system is configured to deliver a first service brake pressure (pBa) to the first service brakes (3) and the service brake control module (10) is configured to generate a first service brake control signal (Sa) depending on a braking command (VA, VB, VP), wherein the brake system is configured to generate the first service brake pressure (pBa) depending on the first service brake control signal (Sa) and to forward the first service brake pressure to the first service brakes (3) for implementation of the braking command (VA, VB, VP), the implementation being electrically controlled by the service brake control module (10) via the first service brake circuit (2a),
- the second service brake circuit (2b) including second service brakes (3), wherein the brake system is configured to deliver a second service brake pressure (pBb) to the second service brakes (3) and the service brake control module (10) is configured to generate a second service brake control signal (Sb) depending on the braking command (VA, VB, VP), wherein the brake system is configured to generate the second service brake pressure (pBb) depending on the second service brake control signal (Sb) and to forward the second service brake pressure to the second service brakes (3) for implementation of the braking command (VA, VB, VP), the implementation being electrically controlled by the service brake control module (10) via the second service brake circuit (2a),
- a parking brake circuit (7) including parking brakes (8), wherein the parking brakes (8) are configured to be applied for parking braking or for auxiliary braking of the vehicle (100),
- a trailer control module (15) including a trailer brake pressure connection point (16) for connection to a trailer brake pressure coupling head (50), wherein the trailer control module (15) is configured to generate a trailer brake pressure (pA) and to output the trailer brake pressure (pA) via the trailer brake pressure connection point (16),
- wherein the brake system is configured to perform at least one of the following safety braking measures in the event of a malfunction of the first brake circuit (2a); or of the second brake circuit (2b); or of the trailer control module (15):
- in the event of a malfunction of the first service brake circuit (2a):
- to control the first service brake pressure (pBa) at the first service brakes (3) of the first service brake circuit (2a) depending on the trailer brake pressure (pA) specified by the trailer control module (15); or
- in the event of a malfunction of the second service brake circuit (2b):
- to control the second service brake pressure (pBb) at the second service brakes (3) of the second service brake circuit (2b) depending on the trailer brake pressure (pA) specified by the trailer control module (15) or to apply the parking brakes (8); or
- in the event of a malfunction of the trailer control module (15): to control the trailer brake pressure (pA) at the trailer brake pressure coupling head (50) depending on the first service brake pressure (pBa) or on the second service brake pressure (pBb).

2. The electronically controllable brake system (1) as claimed in claim 1, wherein the parking brakes (8) are configured as spring brakes receiving a parking brake pressure (pPH), and wherein in the event of a malfunction of the first or second service brake circuit (2a, 2b), the parking brake pressure (pPH) is controllable directly by the trailer brake pressure (pA) or by the trailer control module (15) depending on the trailer brake pressure (pA) specified.

3. The electronically controllable brake system (1) as claimed in claim 2, wherein the trailer brake pressure (pA) is inversely proportional to the parking brake pressure (pPH) or to a parking brake control pressure (pSPH) specifying the parking brake pressure (pPH) for implementing the braking command (VA, VB, VP) in the parking brake circuit (7) via the spring brakes (8).

4. The electronically controllable brake system (1) as claimed in claim 2, wherein a parking brake control module (18) is disposed in the parking brake circuit (7) for outputting the parking brake pressure (pPH) depending on the braking command (VA, VB, VP) specified for the parking brake circuit (7).

5. The electronically controllable brake system (1) as claimed in claim 4, wherein
the parking brake control module (18) is connected to the spring brakes (8) of the parking brake circuit (7) for pneumatic transmission of the parking brake pressure (pPH) to the spring brakes (8) or
the parking brake control module (18) is connected to the trailer control module (15) for pneumatic transmission to the trailer control module (15)
of the parking brake pressure (pPH), or
of a pressure generated by the parking brake control module (18) in dependence on the parking brake pressure (pPH).

6. The electronically controllable brake system (1) as claimed in claim 4, wherein the parking brake control module (18) is integrated within the trailer control module (15) and the braking command (VA, VB, VP) can be transmitted electrically to the trailer control module (15),
wherein the trailer control module (15) is configured
to generate the parking brake pressure (pPH) in accordance with the braking command (VA, VB, VP) from the parking brake control module (18) and
to control the pressure at the spring brakes (8) in the parking brake circuit (7) via a parking brake output (16a), and
wherein the parking brake pressure (pPH) output via the parking brake output (16a) is inversely proportional to the trailer brake pressure (pA) that is output via the trailer brake pressure connection point (16) or via the redundancy output (16b).

7. The electronically controllable brake system (1) as claimed in claim 2, wherein an inverse relay valve (26) is disposed in the trailer control module (15) for inverting the parking brake pressure (pPH) pneumatically transferred to the trailer control module (15) from a parking brake control module (18) to produce a trailer brake pressure (pA) that is inversely proportional to the parking brake pressure (pPH).

8. The electronically controllable brake system (1) as claimed in claim 1, wherein the trailer control module (15) comprises a redundancy output (16b), wherein the trailer control module (15) is configured to output the trailer brake pressure (pA) via the redundancy output (16b).

9. The electronically controllable brake system (1) as claimed in claim 1, wherein the braking command is at least one of:
an assistance braking command (VA) that is automatically specified by an assistance control module (35);
a parking brake braking command (VP) manually specified via a parking brake actuation device (19); and
a service brake braking command (VB) manually specified via an electronic brake indicator (13).

10. The electronically controllable brake system (1) as claimed in claim 1, further comprising an electronic brake indicator (13) connected to the service brake control module (10) and to the trailer control module (15) for transmitting a manually specified service brake braking command (VB).

11. The electronically controllable brake system (1) as claimed in claim 10, wherein the trailer control module (15) is configured to implement the service braking command (VB) and to control the trailer brake pressure (pA) depending on the service braking command.

12. The electronically controllable brake system (1) as claimed in claim 1,
wherein a first pressure modulator (9a) is disposed in the first service brake circuit (2a), wherein the first pressure modulator (9a) comprises a first pressure modulator output (9a1) and the first pressure modulator (9a) is configured to generate a first pressure modulator output pressure (pDa) depending on the first service brake control signal (Sa) and to output the first pressure modulator output pressure (pDa) via the first pressure modulator output (9a1), wherein the brake system is configured to transfer the first pressure modulator output pressure (pDa) to the first service brakes (3) as the first service brake pressure (pBa); and
wherein a second pressure modulator (9b) is disposed in the second service brake circuit (2b), wherein the second pressure modulator (9b) comprises a second pressure modulator output (9b1) and the second pressure modulator (9b) is configured to generate a second pressure modulator output pressure (pDb) depending on the second service brake control signal (Sb) and to output the second pressure modulator output pressure (pDb) via the second pressure modulator output (9b1), wherein the brake system is configured to transfer the second pressure modulator output pressure (pDb) to the second service brakes (3) as the second service brake pressure (pBb).

13. The electronically controllable brake system (1) as claimed in claim 12, wherein the first pressure modulator (9a) comprises a first redundancy pressure connection point (12a) and wherein the brake system is configured to specify the trailer brake pressure (pA) at the first redundancy pressure connection point (12a) as a redundancy pressure (pRa).

14. The electronically controllable brake system (1) as claimed in claim 13, wherein a redundancy valve is connected upstream or downstream of the first redundancy pressure connection point (12a), wherein the redundancy valve can be placed in two redundancy valve switching positions and the redundancy valve
blocks the trailer brake pressure (pA) generated in the trailer control module (15) as the redundancy pressure (pRa) in a first redundancy valve switching position; and
releases the trailer brake pressure (pA) generated in the trailer control module (15) to the first redundancy pressure connection point (12a) as the redundancy pressure (pRa) for redundant control of the pressure modulator (9a) in a second redundancy valve switching position.

15. The electronically controllable brake system (1) as claimed in claim 13, wherein the second pressure modulator (9b) comprises a second redundancy pressure connection point (12b) and wherein the brake system is configured to specify the trailer brake pressure (pA) at the second redundancy pressure connection point (12b) as the redundancy pressure (pRb).

16. The electronically controllable brake system (1) as claimed in claim 13, wherein the trailer control module (15) comprises a third redundancy pressure connection point (12c), wherein the brake system is configured to control the first or second service brake pressure (pBa, pBb) at the third redundancy pressure connection point (12c) as the redundancy pressure (pRc), wherein the trailer control module (15) is configured to control the trailer brake pressure (pA) at the trailer brake pressure connection point (16) depending on the redundancy pressure (pRc) at the third redundancy pressure connection point (12c).

17. The electronically controllable brake system (1) as claimed in claim 12, wherein the pressure modulators (9a, 9b) are configured to generate the pressure modulator output pressures (pDa, pDb) depending on the trailer brake pressure (pA) supplied to the redundancy pressure connection (12a, 12b) for redundant specification of the service brake pressure (pBa, pBb) when a command for the service brake pressure (pBa, pBb) is prevented that is dependent on first or second service brake control signals (Sa, Sb) provided by the service brake control module (10).

18. The electronically controllable brake system (1) as claimed in claim 1, wherein the first brake circuit (2a) and the second service brake circuit (2b) are supplied with energy from a first energy source (11a) and the trailer control module (15) is supplied with energy from a second energy source (11b), wherein the first energy source (11a) is independent of the second energy source (11b).

19. A commercial vehicle (100), comprising an electronically controllable brake system (1) as claimed in claim 1.

20. A method for controlling an electronically controllable brake system (1) as claimed in claim 1, the method comprising the following steps:
Determining whether the braking command (VA, VB, VP) can be implemented under electrical control by the service brake control module (10) by means of the first service brake circuit (2a) or the second service brake circuit (2b);
Generating the trailer brake pressure (pA) in the trailer control module (15) depending on the braking command (VA, VB, VP) specified to the trailer control module (15); and
upon determining that an implementation of the braking command (VA, VB, VP) by means of the first service brake circuit (2a) via electrical control by the service brake control module (10) is prevented:
Generating the first service brake pressure (pBa) in the first service brake circuit (2a) depending on the trailer brake pressure (pA) produced in the trailer control module (15); and
upon determining that an implementation of the braking command (VA, VB, VP) by means of the second service brake circuit (2b) via electrical control by the service brake control module (10) is prevented:
Generating the second service brake pressure (pBb) in the second service brake circuit (2b) depending on the trailer brake pressure (pA) produced in the trailer control module (15) or applying the parking brakes (8).

21. The method as claimed in claim 20, wherein the parking brakes (8) are configured as spring brakes and a parking brake pressure (pPH) is delivered to the spring brakes, wherein clamping the parking brakes (8) comprises:
Generating the parking brake pressure (pPH) depending on the trailer brake pressure (pA) generated in the trailer control module (15).

22. A method for controlling an electronic brake system (1) as claimed in claim 1, the method comprising the following steps:
Determining whether the braking command (VA, VB, VP) can be implemented by the trailer control module (15); and
upon determining that an implementation of the braking command (VA, VB, VP) electrically controlled by the trailer control module (15) is prevented:
Generating the trailer brake pressure (pA) at the trailer brake pressure coupling head (50) depending on the first or second service brake pressure (pBa, pBb).

* * * * *